United States Patent
Edwards

(10) Patent No.: US 8,588,866 B1
(45) Date of Patent: *Nov. 19, 2013

(54) DEPICTING SIGNAL STRENGTH AND BATTERY LEVEL OF A MOBILE COMMUNICATIONS DEVICE

(75) Inventor: Chris Michael Edwards, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 8 days.

This patent is subject to a terminal disclaimer.

(21) Appl. No.: 13/038,178

(22) Filed: Mar. 1, 2011

Related U.S. Application Data

(63) Continuation of application No. 12/042,020, filed on Mar. 4, 2008.

(51) Int. Cl.
- *H04B 1/38* (2006.01)
- *H04W 4/00* (2009.01)
- *H04M 1/00* (2006.01)
- *G06F 3/048* (2013.01)
- *G06F 3/14* (2006.01)

(52) U.S. Cl.
USPC ..... 455/572; 455/427; 455/575.1; 455/575.2; 455/575.3; 455/575.4; 715/848; 715/849; 715/850; 715/851; 715/852; 715/864

(58) Field of Classification Search
USPC .............. 455/575.1–575.4, 572; 715/772, 715/848–852, 864
See application file for complete search history.

(56) References Cited

U.S. PATENT DOCUMENTS

| | | | | |
|---|---|---|---|---|
| 7,050,829 | B2 * | 5/2006 | Motohashi | 455/556.1 |
| 7,380,215 | B2 * | 5/2008 | Nystrom et al. | 715/772 |
| 7,800,633 | B2 * | 9/2010 | Seo | 345/629 |
| 7,929,998 | B1 * | 4/2011 | Edwards | 455/572 |
| 8,036,713 | B2 * | 10/2011 | Ryu et al. | 455/566 |
| 2003/0060238 | A1 * | 3/2003 | McCarthy et al. | 455/566 |
| 2003/0073430 | A1 * | 4/2003 | Robertson et al. | 455/416 |
| 2003/0083050 | A1 * | 5/2003 | Kraft et al. | 455/414 |
| 2003/0099344 | A1 * | 5/2003 | Kraft et al. | 379/387.01 |
| 2004/0214610 | A1 * | 10/2004 | Tanemura et al. | 455/566 |
| 2006/0279559 | A1 * | 12/2006 | Kongqiao et al. | 345/179 |
| 2008/0012825 | A1 * | 1/2008 | Robertson et al. | 345/156 |
| 2009/0249247 | A1 * | 10/2009 | Tseng et al. | 715/808 |
| 2011/0012923 | A1 * | 1/2011 | Seo | 345/629 |
| 2011/0254858 | A1 * | 10/2011 | Seo | 345/629 |

OTHER PUBLICATIONS

Gizmodo: http://gizmodo.com/gadgets/cellphones/water-level-battery-indicator-196758.php.*

* cited by examiner

*Primary Examiner* — Bobbak Safaipour

(57) ABSTRACT

Signal strength and battery level are presented on a display associated with a mobile communications device. A scene is presented on the display, where the scene includes constituent items that collectively convey the battery level and the signal strength. Different states of the constituent items correspond to different states of the battery level and the signal strength. The constituent items together form a representation of a real-world situation.

18 Claims, 4 Drawing Sheets

US 8,588,866 B1

DEPICTING SIGNAL STRENGTH AND BATTERY LEVEL OF A MOBILE COMMUNICATIONS DEVICE

CROSS-REFERENCE TO RELATED APPLICATIONS

This application is a continuation of U.S. patent application Ser. No. 12/042,020, filed Mar. 4, 2008, which is titled DEPICTING SIGNAL STRENGTH AND BATTERY LEVEL OF A MOBILE COMMUNICATIONS DEVICE, the entire disclosure of which is hereby incorporated by reference.

SUMMARY

Embodiments of the present invention are defined by the claims below. But summarily, embodiments provide a device and way to depict signal strength and battery level of a mobile communications device.

In a first aspect, a scene is depicted on the device display, where the scene includes real-world items that collectively reflect a real-world situation. A depiction of one set of the real-world items is varied to correspond to the battery level. A depiction of another set of the real-world items is varied to correspond to the signal strength.

In a second aspect, a scene is depicted on the device display, where one depiction within the scene indicates the battery level and another depiction within the scene indicates the signal strength. The depictions collectively form the scene, which depicts a possible real-world situation.

In a third aspect, a scene is presented on the device display, where the scene includes constituent items that collectively display the battery level and the signal strength. Different states of a constituent item correspond to different states of the battery level. Different states of another constituent item correspond to different states of the signal strength. The constituent items together form a representation of a real-world situation.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer program product. Accordingly, some embodiments may take the form of a hardware embodiment or a computer program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
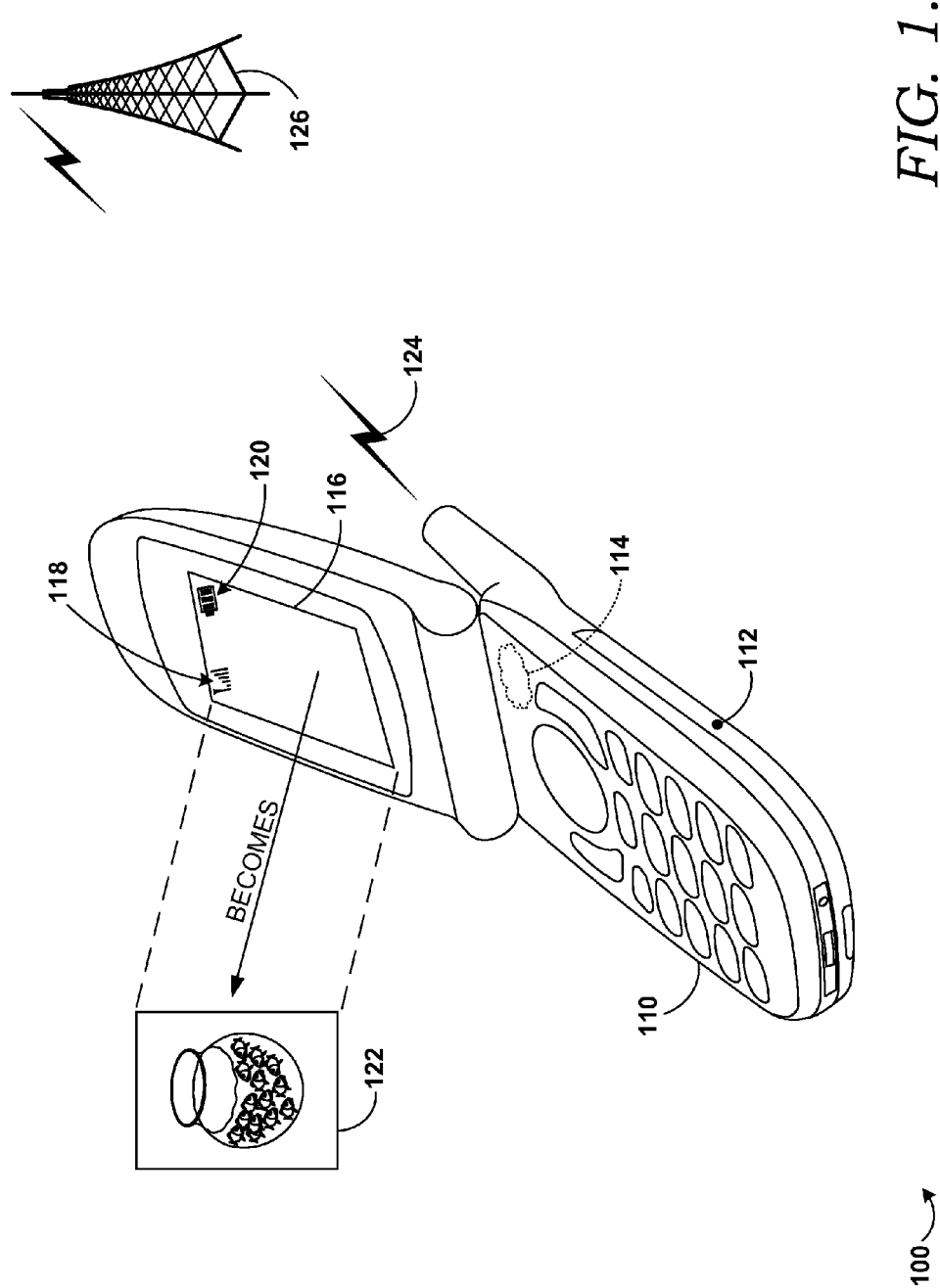
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 includes a mobile device 110, which includes a battery 112, a set of computer-usable instructions 114 to help carry out various aspects of the invention, as well as a display 116.

Display 116 has historically been used to present a signal-level indication 118 and a battery-level indication 120 in the manner shown; that is, using a series of bars to display signal-indication 118, and a representation of a battery 120 to indicate battery strength. As will be explained in greater detail below, embodiments of the present invention will replace indications 118 and 120 with a scene 122 that includes aspects that collectively convey a strength of a battery 112 and a strength of a signal such as signal 124, which is a signal received from a power source 126 in one embodiment, which forms part of a wireless communications network. In other embodiments, signal 124 may come from another form of a communications network, such as a wifi network for example.

Figure 2:
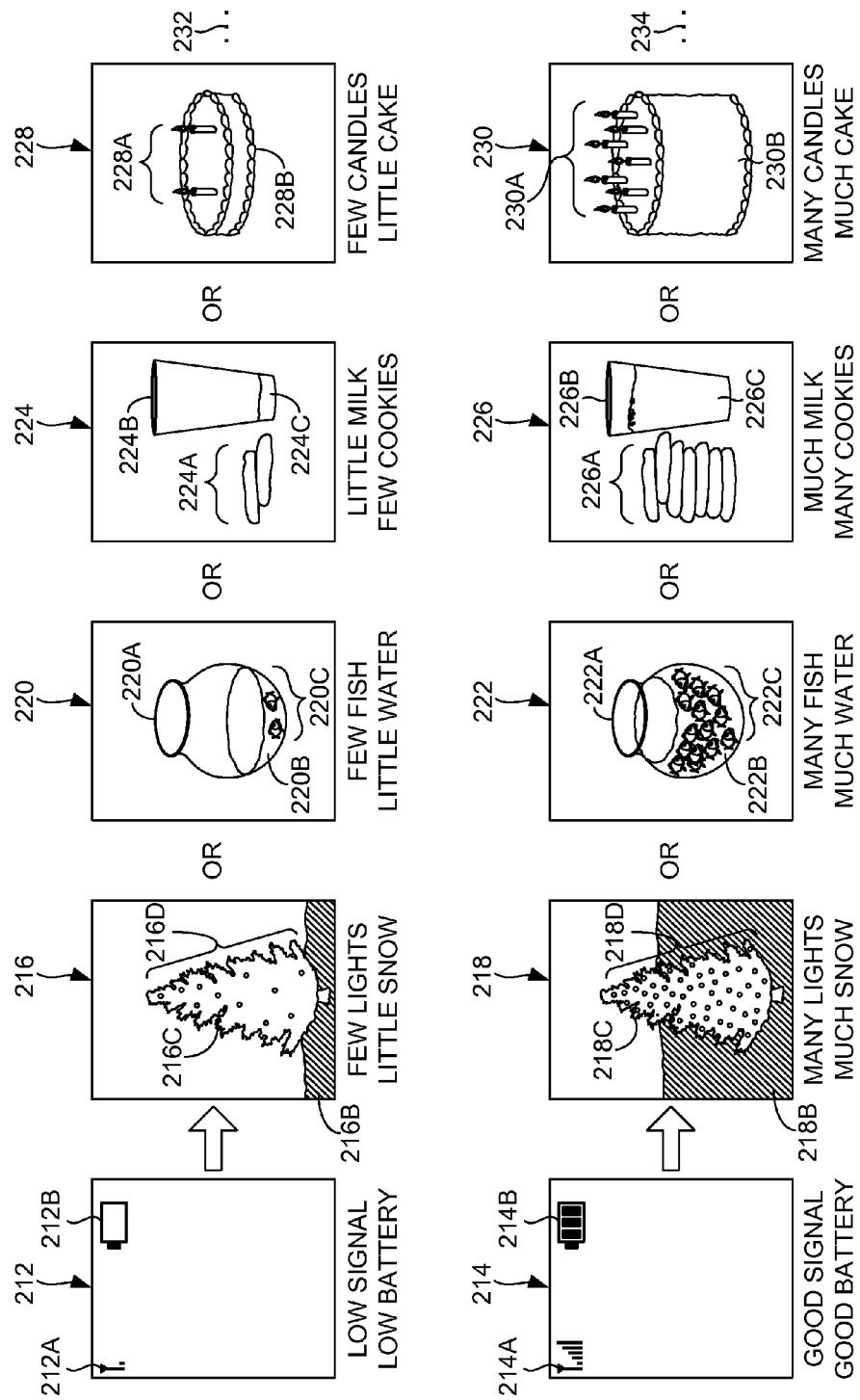
FIG. 2 depicts several illustrative scenes that are suitable for operation in connection with various embodiments of the present invention.

Turning now to FIG. 2, various examples of embodiments of utilizing a scene to convey a battery-level indication as well as signal-level strength indication are presented. Four illustrative examples are shown, but clearly almost limitless options exist. That is, any scene that includes two items that can be depicted in varying degrees of contrast can be used to depict the battery level and signal strength. The examples shown are for illustrative purposes and should not be construed as limiting. Varying degrees of contrast include the concept of each item being able to be shown in varying degrees of contrast between a first state and an ultimate ending state as well as being able to be shown in contrast to another item that depicts an indication of a different resource. For example, an illustrative first item might be a depth of snow. The depth of snow can be shown in varying degrees of contrast to itself; that is, by being at a first height and then ultimately being at a second height. But the snow may also be able to be shown in varying degrees of contrast against another item, such as a Christmas tree, which itself can include attributes that vary with the resource which it depicts.

Consider depiction 212, which is a depiction consistent with the prior art, and shows a signal-strength indication 212A as well as a battery-level indication 212B. Depiction 212 shows low signal and low battery strength. Similarly, depiction 214 also shows a prior art example with high signal strength and full battery. These attributes are represented by signal-strength indication 214A, which depicts the high signal, and battery-level indication 214B, which depicts a full battery.

One illustrative way of depicting this scenario in depiction 212 is shown in depiction 216. Depiction 216 is a scene made up of a Christmas tree 216C that includes a number of lights 216D and an amount of snow 216B. As shown, scene 216 includes only a few lights 216D and little snow 216B. There are only a few lights on Christmas tree 216 and only a little snow because, consistent with depiction 212, the battery-strength is low and the signal-strength is low. Thus, in this illustrative example 216, the number of Christmas lights corresponds to signal-strength; that is the strength of a signal 124. Similarly, the amount of snow 216 corresponds to the charge remaining in battery 112. Some individuals with diminished visual or cognitive capacities may not be able to view the depiction 212 as well as they can scene 216.

For example, a child may not understand what indicator 212A represents nor what indicator 212B represents. But the child might understand the concept of desiring to have as many lights on Christmas tree 216 as possible and desiring to have as much snow on the ground as possible. Thus, a child might be instructed to attempt to get as many lights on the Christmas tree and as much snow 216B as possible. That is, if the amount of snow begins to melt away, the child can be instructed to plug the phone in to make it happy. Even for individuals that are not children, or do not have diminished cognitive abilities, scenes such as those shown in FIG. 2 (as well as those contemplated within the spirit of FIG. 2 but not particularly described so as to save space) offer a degree of an individuality by which users can express themselves. The example of depiction 216 is carried through in depiction 218, which includes a scene that is made up of an amount of snow 218B as well as a Christmas tree 218C that includes a number of lights 218D. Here, as opposed to the scenario being depicted in depiction 216, signal-strength is high and battery-level is also high. The high signal-strength is represented by the many lights 218D as compared to the few number of lights 216D. Similarly, the high battery-level is indicated by a high level of snow 218B as compared to the low amount of snow 216B. Accordingly, an individual viewing scenes 218 will know that all is well; that is, signal-strength is high, battery-level is high, and mobile device 110 is happy.

Hopefully it is becoming clear how wide a range or how many different first items and second items can be used to indicate signal-strength and battery-level. In the illustrative examples shown, the scenes are actually a departure from prior art examples such as 212A and 212B that try to include icons that people will normally associate with signal-strength and batter-level. But here, the different items and the different scene really would not be known to be associated with signal-strength or battery-level unless someone instructed a user that such is the case.

Continuing with another example, consider depiction 220, which includes a scene 220A that is made up of a fish bowl 220A that has a low level of water 220B and only a few fish 220C. In this example 220, the low amount of water 220B corresponds with a low signal-strength. Of course it could also be the case that the low level of water 220B might correspond to a low battery-level. All of the examples described are as applicable in a vice-versa scenario. Illustratively, the few number of fish 220C might correspond to a low battery-level.

Depiction 220 is to be contrasted with depiction 222, in which the corresponding scene is to depict high signal-strength and a fully charged battery. This is represented by fish bowl 222A containing a relatively high level of water 222B and relatively high number of fish 222C. That is, many fish 222C indicate a high battery-level (or signal-level, as the case may be), while the high water level 222B indicates a high battery-level. Again, a child could be instructed that it is not a good thing to have a low amount of water and only a few goldfish or any kind of fish. Each of these scenes can reflect a real-world situation.

That is, in the real world, it would not be good to have a fish bowl with shallow water and only a few fish; particularly if a child likes fish, and thus would like to have as many fish as possible. If a child understands that having a high water level and many fish is a more desirable situation, then the child can be instructed to attempt to pursue a scene such as that depicted in depiction 222 if a scene such as that depicted in depiction 220 ever occurs. Thus, a child could be instructed to recharge mobile device 110 to try to increase water level 222B, or to move to a different location to attempt to increase the signal-strength (the number of fish).

By way of still another example, and with reference to depiction 224, which depicts another illustrative real-world situation that is made up of a few number of cookies 224A and glass 224B that only has a small amount of milk 224C. This real-world situation reflects a low signal-strength and low battery. By way of example, perhaps the milk represents signal-strength and the number of cookies represents a battery-level. In depiction 224, the little milk 224C would correspond to a low signal-strength, while the few number of cookies 224A would correspond to a low battery.

The real-world situation reflected in depiction 224 can be contrasted against that reflected in depiction 226, which is meant to convey good signal-strength and high battery-level by showing a relatively full glass 226B of milk 226C as well as many cookies 226A. Of course if the child or the user desires or likes other items, such as peas, green beans, jelly beans, etc., then those could replace cookies 226A. And milk 226C could be made to resemble any type of drink or other item that the user of mobile device 110 likes. In some embodiments, the scenes reflected in FIG. 2 consume substantially all of the display area of display 116. That is, the full screen 116 becomes usable to indicate both battery-strength and signal-level as opposed to the common use of trying to utilize as small amount of screen real estate as possible in the prior art.

Depictions 228 and 230 show a final illustrative example of items that are represented in varying degrees of contrast and that represent real-world situations to reflect battery-level and signal-strength according to an embodiment of the present invention. Depiction 228 shows a birthday cake 228B that includes a few number of candles 228A. That is, birthday cake 228B is shown as a short cake, representing only little cake and only a few number of candles 228A, which reflects an illustrative real-world situation of there being low signal-strength and low battery-level.

This scenario can be compared with that depicted by depiction 230, which reflects a real-world situation of high signal-strength and a full battery. Depiction 230 includes much cake 230B as well as many candles 230A. Clearly, if a child desires or likes cake, then the child would desire to have as much cake as possible. And if this were the case, then the child could be instructed that as the cake dwindles, the child should attempt to replace the cake by charging the phone. Moreover, a child may desire to as old as possible, and thus have as many candles 230A as possible, and as they become fewer and fewer, mobile device 110 should be physically moved in the hopes of garnering additional candles.

Figure 3:
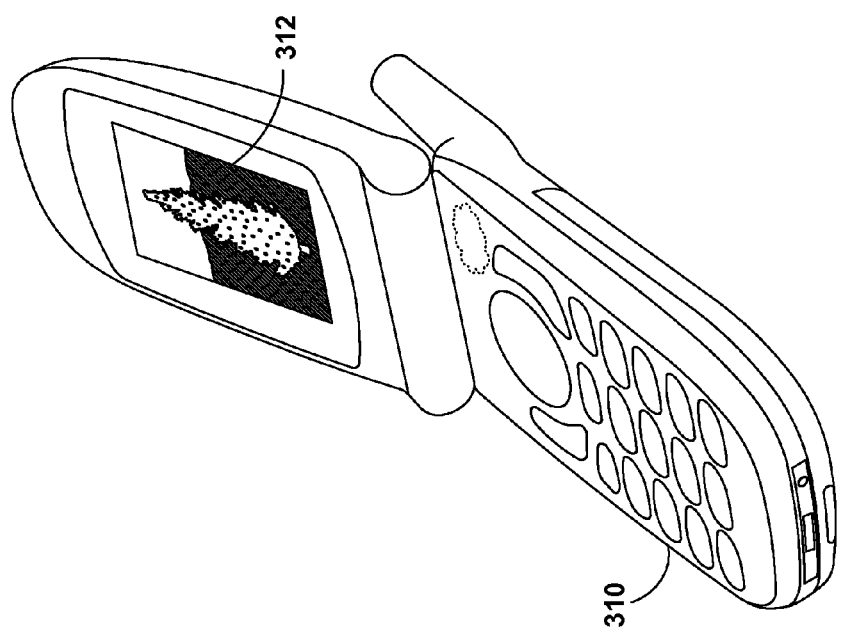
FIG. 3 depicts an illustrative scene 312 appearing on a mobile communications device.

FIG. 3 shows an illustrative example 300 of a mobile device 310 that includes a scene 312 to depict an indication of battery-level and signal-strength.

Figure 4:
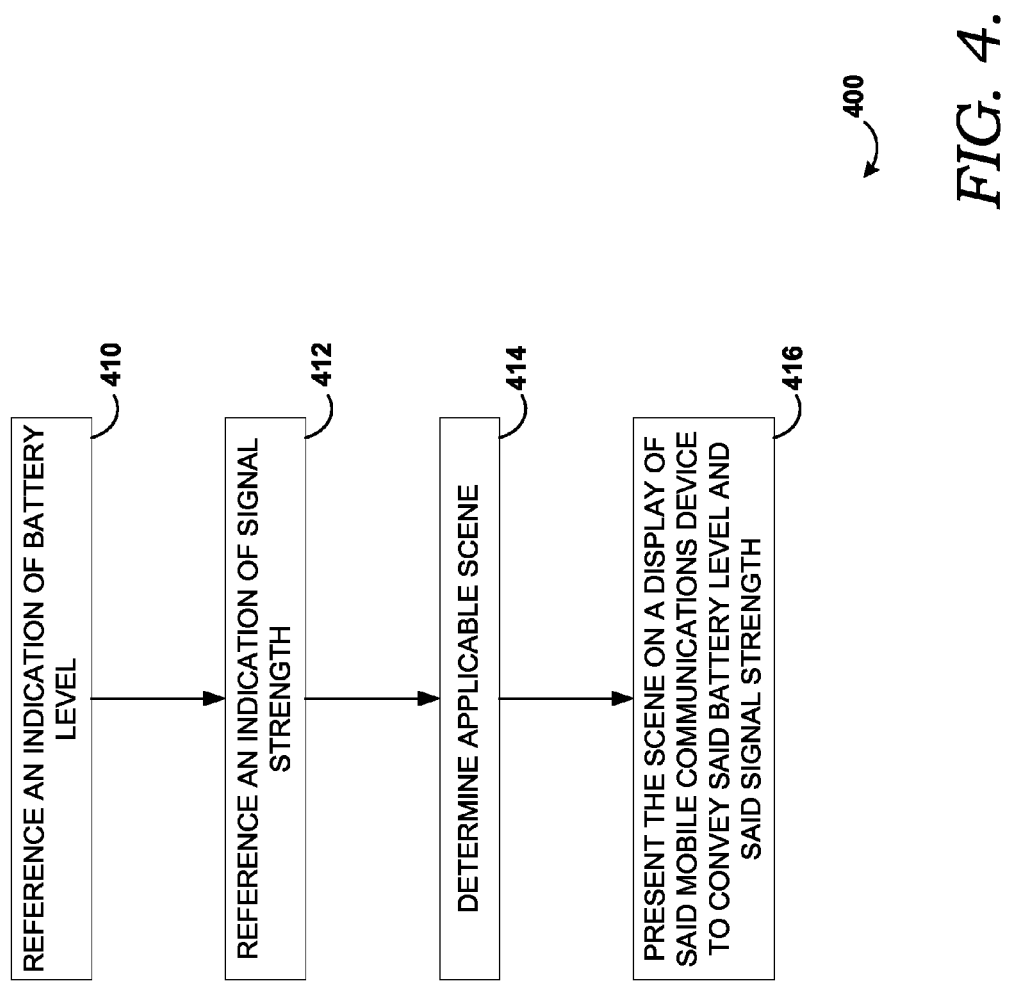
FIG. 4 depicts a flowchart of an illustrative process of depicting battery level and signal strength of a mobile communications device according to an embodiment of the present invention.

To recapitulate, one aspect of our invention includes performing a method of depicting a battery level and a signal strength of a mobile communications device. With reference to FIG. 4, an illustrative method will be explained for presenting the battery level and signal strength. To help describe this illustrative method, reference will be made to depictions 220 and 222 on FIG. 2, and if necessary FIG. 1 generally. At a step 410, reference is made to an indication of battery level. This can include referring directly to battery 112 of mobile device 110. In other embodiments, a processing component (not shown) is persistently aware of a level of battery strength of battery 112. In such an embodiment, that processing component can be referenced to receive an indication of an amount of battery level, or charge, remaining in battery 112. The lower level details of determining a battery level are not shown for the sake of brevity.

Similarly, at a step 412, reference is made to an indication of signal strength. In one embodiment, this includes referencing or determining a strength of signal 124, which is a wireless-communications signal that is received by mobile device 110. As mentioned, signal 124 can take on a variety of forms. Illustrative forms include a signal from a wireless telecommunications network (wherein illustrative protocols include CDMA, GPRS, GSM, TDMA, etc.), Wi-Fi, infrared, and the like. Mobile communications device 110 is equipped with components (not shown) that receive and determine a strength of a signal such as signal 124. Historically, that signal level has been presented in a manner similar to that depicted by reference numeral 118.

At a step 414, a determination is made as to what is an applicable scene. This determination can flow from a variety of possibilities. For example, a user may have indicated a preference of a specific scene. FIG. 2 depicts four illustrative scenes, and ellipses 232 and 234 make clear that many other possibilities are possible. The range of possible scenes is almost limitless. In another embodiment, mobile device 110 may be configured to pick from a variety of scenes if a user so desires. In still another embodiment, mobile device 110 may be equipped with only a single scene, in which case that scene will be the one presented on display 116. Thus in the situation where only a single scene exists to be presented, the determining step is simple in that the determination is made to present the only scene available.

At a step 416, an indication of battery level and of signal strength is presented consistent with the applicable scene. An illustrative scene is that of 220 in FIG. 2. The scene presented will include a depiction of two items that collectively reflect a real-world situation. The first item includes a first set of one or more features that collectively represent battery level. A second item includes a second set of one or more features that collectively represent the signal strength. Thus, with reference to scene 220, a real-world situation of fish in a fishbowl is presented. The first item in this example is a depth of water. That is, the depth of water depicted in scene 220 (or 222) conveys a battery level. For example, the shallow water level 220B corresponds to a low battery level. Thus the level of water corresponds to the level of charge in battery 112. A second item, a number of fish, is used to convey information about the strength of the signal being received by mobile device 110. In this example, few fish 220C corresponds to low signal strength. If signal strength were high, then many fish would be shown, as indicated by reference numeral 222C in depiction 222, which also shows a relatively higher depth of water 222B, corresponding to good battery level.

As mentioned, each item may have one or more features that collectively represent either battery level or signal indication. For example, consider depictions 216 and 218 of FIG. 2. The Christmas tree and number of lights are used to convey signal strength in the illustrative example shown. Technically, the number of lights is used to convey signal strength. But showing the lights in connection with the Christmas tree helps place the lights in context. Moreover, in another embodiment, the brightness of the Christmas lights might be used to convey signal strength. Accordingly, these different features (the Christmas tree, the number of lights, the brightness of the lights, and various combinations) are used to collectively convey information about the strength of signal 124.

In other embodiments, fewer features are used to convey information about signal strength or battery level. For example, in depiction 220, the number of fish is used to convey signal level.

As briefly mentioned earlier, the different items can be shown in varying degrees of contrast to convey desired information. The varying degrees of contrast can be with respect to different states of the same item as well as to different items themselves. For example, the number of fish in fishbowl 220B can be shown in varying degrees of contrast between a first state (shallow water) and a second state (deeper water 222B). Moreover, the water itself 220B can be shown in varying degrees of contrast with another item, which conveys information about a different scene being measured, such as battery level instead of signal strength. Thus, the depth of water can be contrasted against the number of fish in the fishbowl. In this regard, an initial state of one of the items might correspond to a relatively high signal strength, and a second state might correspond to a relatively low signal strength or vice versa. Similarly, a first state of another item might correspond to a relatively high battery level, and a second state corresponds to a relatively low battery level, or vice versa. In one embodiment, the first state transitions to the second state as either battery level or signal strength transitions from a high level to a relatively lower level or vice versa.

In one embodiment, a method of depicting battery level and signal strength of mobile device 110 includes presenting a scene on a display of the mobile device, wherein the scene consumes substantially all of display 116. Information about the battery level and signal strength is conveyed by way of a first depiction as well as a second depiction within the scene, and the two depictions collectively form the scene, which reflects a possible real-world situation. The first depiction, or depiction that presents the strength of a battery level, does not take the form of a battery. That is, the scope of our invention does not extend to a depiction of a battery that conveys battery level. In some embodiments, the depiction that does depict battery level takes the form of an object that would not normally be thought of as representing a battery level unless instruction was provided to make known that it does in fact represent battery level. For example, consider the fish-in-a-fishbowl example. One would not normally think that a number of fish might convey a battery level unless instructed. Similarly, the depiction that depicts signal strength does not take the form of a series of bars as shown by reference numeral 118 in FIG. 1. Rather, it too assumes a depiction that would not normally be thought of as representing signal strength unless instruction was provided to make known that it did represent signal strength. Few people would know that a depth of water 220B would convey signal strength, but it does according to an embodiment of the present invention.

Each depiction includes attributes that transition from a first state to a second state as battery level or signal strength transitions from a first state to a second state.

An indication can be received that indicates a desire to present a scene on display 116. In one embodiment, this indication includes receiving an indication from a triggering component within mobile device 110 that causes the relevant scene to be presented without user interaction. That is, in a first embodiment, a soft key, button, or some other component can be used to trigger a presentation of a scene on display 116. But in other embodiments, scene 122 is automatically presented on display 116 incident to a triggering event that does not involve user interaction. An example of this might be a timer, or might be an automatic response to an event such as a battery level dropping below a threshold value or a signal level dropping below a threshold value so that a user is automatically notified of such situation. Other illustrative triggering events include opening mobile device 110, closing mobile device 110 (with the display on the other side of the side that gets closed), a toggling of a status of a hardware switch, input from a button of mobile device 110, input from a soft key of mobile device 110, or the like.

Many different arrangements of the various components depicted, as well as components not shown, are possible without departing from the spirit and scope of the present invention. For example, In other embodiments, scene 122 takes the form of a screensaver. In some embodiments, scene 122 is persistently displayed if a user so desires. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of depicting a battery level and a signal strength of a mobile communications device ("device"), the method comprising:
    storing a plurality of scenes, wherein each scene depicts a real-world situation, and wherein each scene includes a combination of a first set of one or more items that indicate the battery level and a second set of one or more items that indicate the signal strength;
    determining one of the scenes to present on a display of the device based on a user preference for the scene;
    presenting the scene on the display, wherein presenting the scene includes presenting the combination of the first set and the second set;
    varying a depiction of the first set of one or more of the items to correspond to the battery level;
    varying a depiction of a second set of one or more of the items to correspond to the signal strength;
    wherein the first set of one or more items and the second set of one or more items are related by a context of the real-world situation, and wherein varying the depiction of the first set or varying the depiction of the second set includes varying a number of the items included in the respective set of one or more items.

2. The media of claim 1, wherein one or more of the real-world items is depicted based on a user preference.

3. The media of claim 1, wherein varying the depiction of the first set includes presenting the first set in varying degrees of contrast between a first state and a second state, and wherein varying the depiction of the second set includes presenting the second set in varying degrees of contrast between an initial state and a subsequent state.

4. The media of claim 3, wherein the first state corresponds to a relatively high battery level, and the second state corresponds to a relatively low battery level, or vice versa.

5. The media of claim 4, wherein the initial state corresponds to a relatively high signal strength, and the subsequent state corresponds to a relatively low signal strength, or vice versa.

6. The media of claim 3 wherein the first set and the second set are capable of being presented in varying degrees of contrast to each other.

7. The media of claim 3, wherein the first state transitions to the second state as the battery level transitions from a relatively high level to a relatively low level, or vice versa.

8. The media of claim 3, wherein the initial state transitions to the subsequent state as the signal strength transitions from a relatively high level to a relatively low level or vice versa.

9. One or more nontransitory computer-readable media having computer-useable instructions embodied thereon for performing a method of depicting a battery level and a signal strength of a mobile communications device ("device"), the method comprising:
    storing a plurality of scenes, wherein each scene depicts a possible real-world situation, and wherein each scene includes a combination of a first depiction that indicates the battery level and a second depiction that indicates the signal strength;
    determining one of the scenes to present on a display of the device based on a user preference for the scene;
    presenting the determined scene on the display, wherein presenting the determined scene includes presenting the combination of the first depiction that indicates the battery level and the second depiction that indicates the signal strength;
    wherein the first depiction and the second depiction collectively form the scene that depicts the possible real-world situation, and wherein the first and second depictions are related by a context of the real-world situation.

10. The media of claim 9, wherein the first depiction does not take the form of a battery, such the first depiction would not normally be thought of as representing the battery level unless instruction was provided to make known that the first depiction represents the battery level.

11. The media of claim 9, wherein the second depiction does not take the form of a series of bars of varying height, such the second depiction would not normally be thought of as representing the signal strength unless instruction was provided to make known that the second depiction represents the signal strength.

12. The media of claim 9, wherein the first depiction includes attributes that transition from a first state to a second state as the battery level transitions from a first state to a second state.

13. The media of claim 9, wherein the second depiction includes attributes that transition from an initial state to a subsequent state as the signal strength transitions from an initial state to a subsequent state.

14. One or more nontransitory computer-readable media having computer-useable instructions embodied thereon for performing a method of depicting a battery level and a signal strength of a mobile communications device ("device"), the method comprising:
    storing a plurality of scenes, wherein each scene depicts a possible real-world situation, and wherein each scene includes a combination of a first depiction that indicates the battery level and a second depiction that indicates the signal strength;

determining one of the scenes to present on a display of the device based on a user preference for the scene;

presenting the scene on the display, wherein
- A) the scene includes the combination of the first depiction and the second depiction that collectively convey the battery level and the signal strength, and
- B) different states of the first depiction correspond to different states of the battery level,
- C) different states of the second depiction correspond to different states of the signal strength, and
- D) the first depiction and the second depiction collectively form a representation of the real-world situation in which the first depiction and the second depiction are related by a context of the real-world situation;

wherein the scene is presented upon receiving a notification from a triggering component within the mobile communications device that causes the scene to be presented without user interaction.

15. The media of claim 14, wherein receiving the notification includes receiving the notification incident to an occurrence of a triggering event.

16. The media of claim 15, wherein the triggering event includes at least one of the following:
- an opening of the mobile communications device;
- a closing of the mobile communications device;
- a toggling of a status of a hardware switch;
- input from a button of the mobile communications device; or
- input from a soft key of the mobile communications device.

17. The media of claim 14, wherein the scene is presented as a screen saver on the mobile communications device.

18. The media of claim 17, wherein the screen saver is persistently displayed.

* * * * *